United States Patent [19]
Staggs

[11] 3,815,566

[45] June 11, 1974

[54] ENGINE

[76] Inventor: Jesse D. Staggs, R.R. 2, Box 143, Fallbrook, Calif. 92028

[22] Filed: Feb. 8, 1973

[21] Appl. No.: 330,483

[52] U.S. Cl. ...... 123/191 R, 123/32 C, 123/65 VA, 123/65 VC, 123/191 SP, 123/191 S, 123/65 A
[51] Int. Cl. ........................................... F02b 23/00
[58] Field of Search ......... 123/32 C, 191 R, 191 SP, 123/65 VC, 65 VA, 191 B, 65 A

[56] References Cited
UNITED STATES PATENTS

| | | | |
|---|---|---|---|
| 1,798,033 | 3/1931 | Rochefort | 123/32 C |
| 1,926,499 | 9/1933 | Ricardo | 123/32 C |
| 1,981,874 | 11/1934 | Mock | 123/32 C |
| 2,043,080 | 6/1936 | Vincent | 123/32 C |
| 2,048,223 | 7/1936 | Scott | 123/65 VC |
| 2,766,738 | 10/1956 | Hoffmann | 123/32 C |

FOREIGN PATENTS OR APPLICATIONS

| | | | |
|---|---|---|---|
| 539,568 | 9/1941 | Great Britain | 123/191 P |
| 941,525 | 4/1956 | Germany | 123/32 C |

Primary Examiner—Wendell E. Burns
Attorney, Agent, or Firm—Lindenberg, Freilich & Wasserman

[57] ABSTRACT

A low-pollution engine of the type that burns air and fuel to move a piston, wherein a separate combustion chamber is provided near one end of the cylinder and connected to the cylinder by a constricted passageway, the combustion chamber holding enough air to completely burn all of the fuel therein so that substantially only combustion products enter the cylinder. The walls of the combustion chamber are insulated so that they remain heated, and a perforated plate connects the combustion chamber to the cylinder so that the hot combustion products pass through the plate into the cylinder to heat extra air therein and move the piston. The combustion chamber and cylinder are both purged but by different amounts of air, and fuel is admitted to the combustion chamber by an injection nozzle whose fuel stream hits a target in the combustion chamber to further break up and disperse the fuel.

10 Claims, 10 Drawing Figures

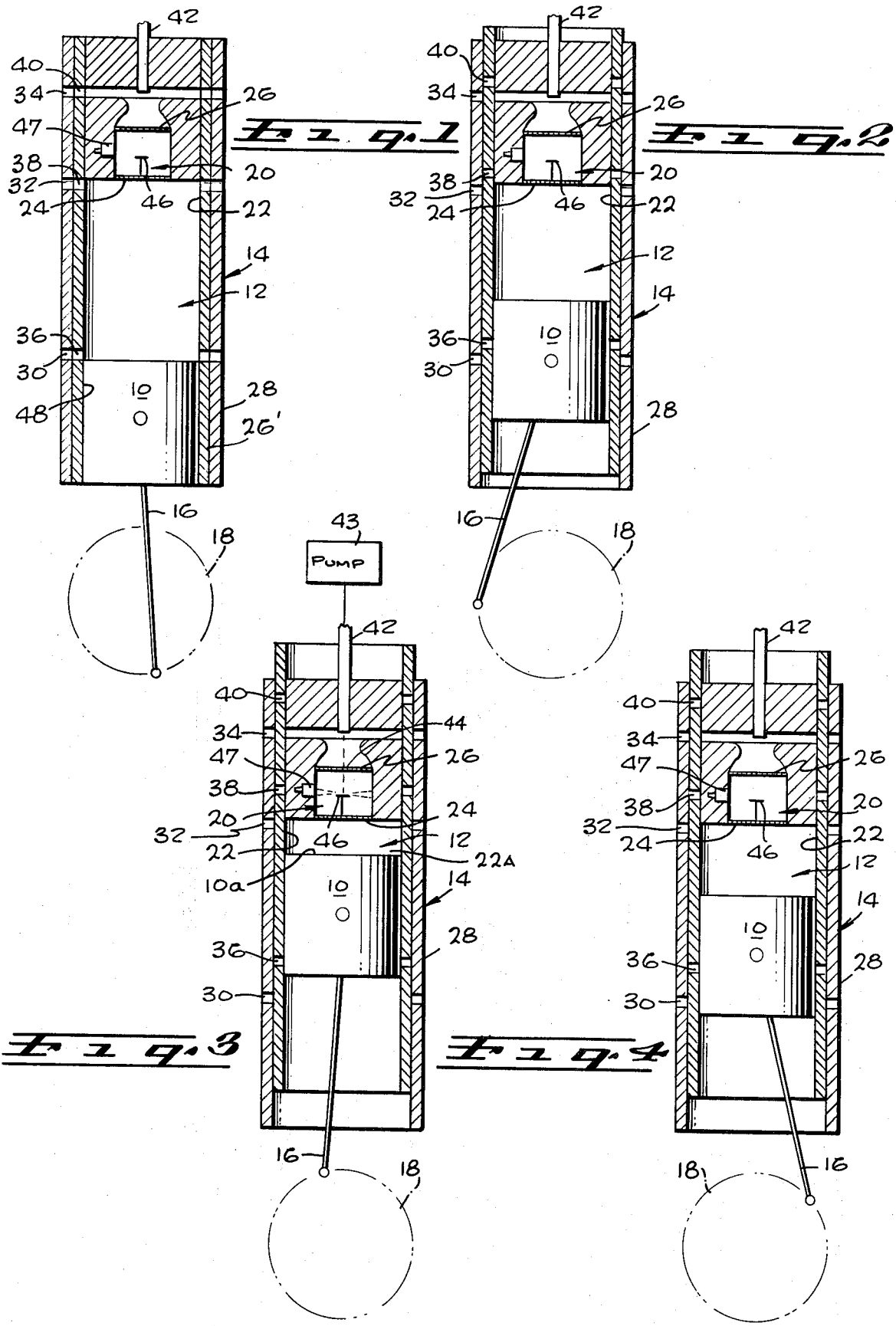

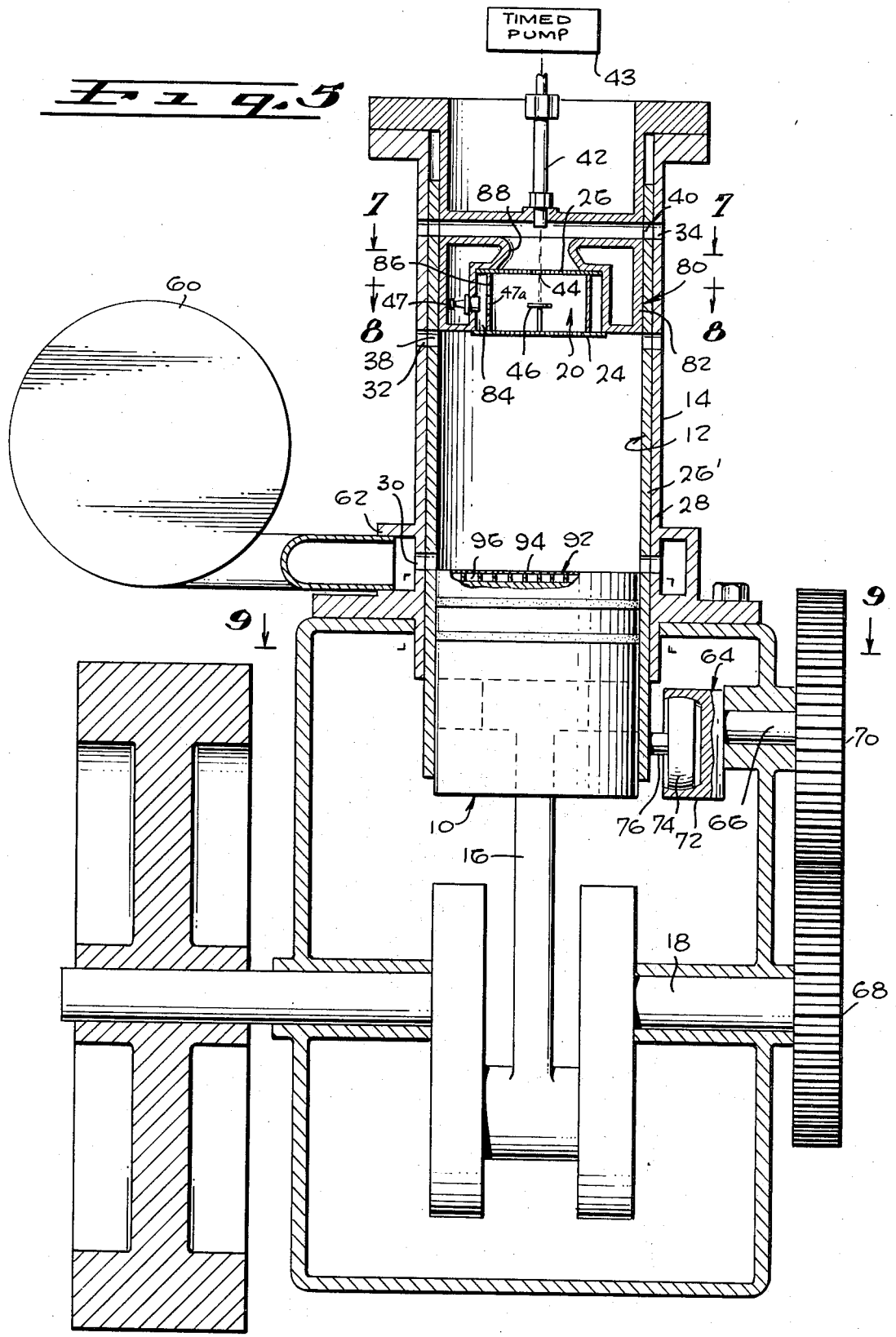

ENGINE

BACKGROUND OF THE INVENTION

This invention relates to engines.

Internal combustion engines normally utilize a reciprocating or rotary piston that moves through a chamber or "cylinder" in which fuel and air is burned. The cylinder is generally specially constructed to provide water or air cooling so that the piston can smoothly move therein. However, such cooling not only adds weight and bulk and wastes heat, but also leads to imcomplete combustion. If substantially all combustion could occur in a region having very hot walls, and with only the combustion products applied to the piston to move it, then highly efficient combustion and utilization of fuel could be achieved. Such efficient combustion would be especially useful in minimizing pollution from fuel-burning engines.

SUMMARY OF THE INVENTION

In accordance with one embodiment of the present invention, an engine is provided which promotes the efficient combustion of fuel in an engine of minimum size and complexity. The engine utilizes a separate combustion chamber communicating through a constricted passageway with a cylinder in which the piston moves. The cylinder includes an extra-air space above the piston, and combustion products mix with the air therein with the mixture of the combustion products and air serving to move the piston. The walls of the combustion chamber are insulated against cooling so that they remain very hot to promote the combustion of fuel therein. One wall of the chamber is a perforated plate that leads to the cylinder, the holes being of sufficient number and size to allow the products of combustion to quickly pass therethrough to move the piston, but the plate serving as a wall that helps to minimize heat loss from the chamber. Both the cylinder and combustion chamber are purged with air at every cycle of operation, but the chamber is purged with a minimum of air to minimize cooling. Fuel is added to the chamber by an injection nozzle whose fuel stream hits a target in the middle of the chamber to atomize and distribute the fuel. The combustion chamber is large enough to hold sufficient air for complete combustion of the fuel even at substantially full load, so that substantially all combustion occurs in the chamber rather than in the cylinder. The fact that a separate combustion chamber is utilized that is largely heat-separated from the cylinder, means that combustion can occur at a chamber whose walls do not have to serve as friction surfaces and which therefore can be maintained at a high temperature.

The novel features of the invention are set forth with particularity in the appended claims. The invention will best be understood from the following description when read in conjunction with the accompanying drawings.

BRIEF DESCRIPTION OF THE DRAWINGS

FIG. 1 is a simplified sectional side view of an engine constructed in accordance with one embodiment of the present invention, showing it at a time in the cycle when air is being admitted and previous combustion products are being scavenged;

FIG. 2 is a view similar to FIG. 1, but at the end of scavenging and the beginning of the compression stroke;

FIG. 3 is a view similar to FIG. 2, but showing the engine at the end of the compression stroke when there is fuel injection, ignition, and combustion;

FIG. 4 is a view similar to FIG. 3, but showing the engine during the expansion stroke;

FIG. 5 is a more detailed sectional side view of the engine of FIG. 1;

DESCRIPTION OF THE PREFERRED EMBODIMENTS

Figure 6:
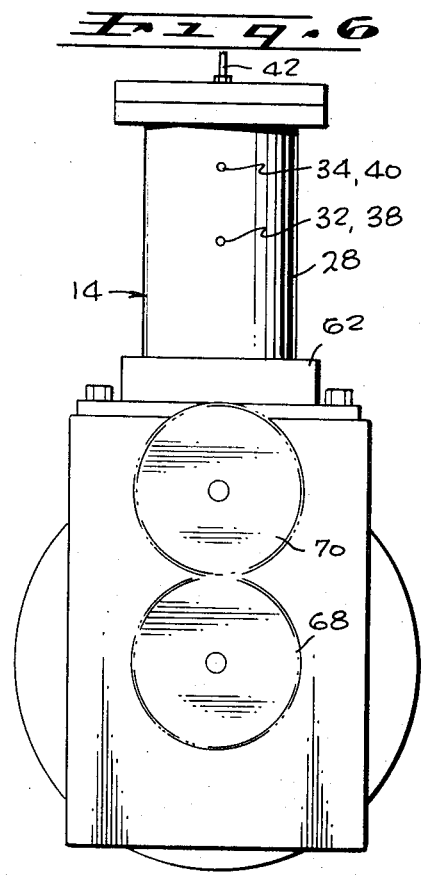
FIG. 6 is a front elevation view of the engine of FIG. 5.

FIGS. 1–4 illustrate an engine of the invention at four different times in an operating cycle. The engine includes a piston 10 which moves within a cylinder region 12 of a cylinder assembly 14, and a connecting rod 16 that connects the piston to a crank shaft assembly indicated at 18. A combustion chamber 20 is located adjacent to a first end 22 of the cylinder region 12 and is in communication with it. During each cycle of the engine, air and fuel are supplied to the combustion chamber 20 are burned therein. The high pressure and temperature combustion products pass out of the chamber 20 and into the cylinder 12 to combine with extra air therein to drive the piston 10.

The combustion chamber 20 is separated from the cylinder region 12 by a plate 24 with many holes therein that form a constricted passage between the chamber and the cylinder region. Another perforated plate 26 lies at the opposite end of the combustion chamber and serves to provide a passage through which the combustion products are scavenged in each cycle. The flow of air into the cylinder region 12 and combustion chamber 20 is controlled by a sleeve valve assembly that forms part of the cylinder assembly 14. The sleeve valve assembly includes a sleeve 26 that can reciprocate within a stationary cylinder member 28. The cylinder member 28 has three sets of ports 30, 32, and 34, and the sleeve 26' has three sets of corresponding ports 36, 38, and 40. When the ports in the cylinder member 28 and sleeve 26' are aligned, air from a compressor can pass through the lowermost ports 30, 36 and displace gases through the ports 32, 38 and the ports 34, 40. Fuel is added to the combustion chamber 20 by a nozzle 42 that is connected to a timed fuel pump 43, the nozzle 42 emitting a stream of fuel through a central hole 44 in the upper perforated plate 26 and into the chamber. A target 46 mounted in a central region of the chamber in alignment with the hole 44, is hit by the fuel and further distributes the fuel in the chamber as well as helping to break it up. A glow plug 47 at the chamber helps to assure ignition of the fuel in case the chamber walls are not hot enough.

FIG. 1 illustrates the engine at the beginning of a cycle when air flows through the ports to purge the cylinder 12 and the chamber 20 of combustion products and admit air therein. At this time, the sleeve 26' is in a position wherein its ports are aligned with the ports in the cylinder member 28, and the piston 10 is near a second end portion 48 of the cylinder region opposite the end portion 22 to which the combustion chamber is connected. Air from a compressor passes through the ports 30, 36 into the cylinder region 12. Some of the spent gases (combustion products and air) in the cylinder region 12 leave through the ports 32, 38 that provide an exit near the upper end 22 of the cylinder region. Some of the combustion products and air in the cylinder region 12 pass through the perforated plate 24, through the combustion chamber 20, through the upper perforated plate 26 and out through the exhaust ports 34, 40.

FIG. 2 illustrates the engine at a later time in the cycle, when th sleeve 26' has just been moved to a closed position and the piston 10 is rapidly moving towards the upper end 22 of the cylinder region. At this time, compression of air in the cylinder region and combustion chamber begins.

FIG. 3 illustrates the engine near the end of the compression stroke, when the piston 10 is nearest the upper end 22 of the cylinder region. At this time, fuel is injected through the nozzle 42 and upper plate 26 into the combustion region 20 and distributed by the target 46 therein. The fuel immediately ignites, and substantially all of the fuel burns within the combustion chamber 20. Much of the hot and high pressure gas created by reason of the combustion in the chamber passes through the holes of the perforated plate 24 into the upper end 22 of the cylinder region to heat and pressurize the volume of air 22A therein.

FIG. 4 illustrates the engine during a time when much of the products of combustion have passed from the chamber 20 into the upper end 22 of the cylinder region 12. These combustion products add to the pressure in the cylinder region and heat the air therein, so that a high pressure is provided which drives down the piston 10. Of course, during this time power is delivered by the cylinder to the crank shaft 18. Near the end of the power stroke when the piston is near the lower end of the cylinder region, the sleeve 26' is again moved down to open the ports for the scavenging of the combustion products and the introduction of air.

FIGS. 5-9 illustrate some of the details of the engine shown in FIGS. 1-4. Air that is used in scavenging is blown into the engine by an air compressor 60 that is connected through a manifold 62 to the ports 30 of the cylinder member. The sleeve 26' which controls the opening and closing of the gas ports and which forms an intake valve and two exhaust valves where it has openings, is reciprocated by a valve operating mechanism 64. The mechanism 64 includes a valve shaft 66 driven by the crank shaft 18 through a pair of gears 68, 70. A spherical bearing 72 is fixed eccentrically to the shaft 66, and a roller 74 within the spherical bearing is connected by a trunnion 76 to an end of the sleeve. At every rotation of the crank shaft 18, the trunnion 76 is moved in a circle, thereby causing the sleeve 26' to slide within the cylinder member 28 as well as to turn slightly about its axis. The particular engine which is illustrated is one which completes a cycle at every revolution of the crank shaft 18, and therefore the sleeve 26' is moved through all positions in each revolution of the crank shaft.

The combustion chamber 20 is formed by a combustion chamber assembly 80 that is designed to retain considerable heat. The chamber assembly includes a double-walled enclosure 82. A cylindrical member 86 is fixed in position within the double-walled enclosure 82 to form part of the actual walls of the combustion chamber, and to provide a dead air space 84 which increases insulation to minimize heat losses. The cylinder 86 and the perforated plates 24, 26 are constructed of material which can withstand the high temperatures under the combustion conditions. The double-walled enclosure 82 also forms an exit passageway 88 for gases passing through the perforated plate 26 and through the exhaust ports 34, 40. The resistance to gas flow through the upper plate 26 and the passages leading through the ports 34, 40 is of the same order of magnitude as the resistance through the lower plate 24, so that a large wall area at 26 is provided without unduly adding to resistance of gas flow in venting.

The two perforated plates 24, 26 are constructed to serve as walls of the combustion chamber that receive and retain heat so as to maintain the chamber walls hot. The perforations in the lowermost plate 24 provide a constricted communication with the cylinder region 12 to retain the fuel-air mixture so that most of the combustion occurs within the combustion chamber, and yet to permit the rapid flow of hot products of combustion to the cylinder region so that most of the flow occurs in a small fraction of a cycle of engine operation. The fact that the hot combustion products must flow through the numerous small holes in the plate 24 means that the plate is rapidly heated when the engine starts. Also, any small amounts of unburned fuel tend to be ignited during passage through the plate. If detonation occurs in the fuel, the resulting shock waves are minimized in passage through the plate 24, so that there is a minimum shock to the piston 10.

The combustion chamber 20 is large enough to hold sufficient air for complete combustion of all fuel injected therein, even at substantially full load. This may be constrasted with a hot bulb engine wherein fuel is sprayed into a hot chamber communicating with the cylinder region, but wherein the bulb is too small to hold enough air for combustion of a majority of the injected fuel, and wherein the bulb is not separately purged to assure a new supply of air in each cycle. The use of a separate combustion chamber results in high effectiveness in the burning of fuel. When the fuel is injected through the hole 44 in the plate 26, it enters a region where the air is already heated to a high temperature. This heating of the air not only increases efficiency, but also promotes the burning of the fuel so that there is a more complete combustion. The combustion can occur at a higher temperature so that a smaller portion of the fuel is left unburned and therefore there is a smaller amount of unburned fuel leaving the engine and causing pollution of the atmosphere. The combustion chamber can be formed in the housing of the engine as in the above described engine, and also can be formed in the piston itself particularly if good heat insulation is provided around the combustion chamber walls.

The reason why the walls of the combustion chamber can be heated to a high temperature is that they are not required to serve as bearing or friction surfaces along which a cylinder moves. Accordingly, materials can be utilized which would not be good bearing surfaces for a piston under the conditions encountered, so long as the material can maintain resonable strength at a high temperature. The cylinder region 12 where piston sliding occurs cannot be allowed to heat to such a high temperature. The temperature in the cylinder region 12 is minimized by the fact that little if any combustion occurs therein and that the gases entering the cylinder region from the combustion chamber mix with extra air in the cylinder region which cools the combustion products. The amount of extra air at full load is largely determined by the volume provided at the upper end 22 of the cylinder region as shown at 22A in FIG. 3, between the upper surface 10a of the piston and the plate 26. In addition, the walls of the cylinder region 12 are cooled by a large flow of air therethrough, which is made possible by the provision of the additional ports 32, 38. Thus, considerable air can be used to scavenge and cool the cylinder region 12 while only a much lesser amount of air scavenges the combustion chamber 20. A minimum of air is utilized in scavenging the combustion chamber 20 to minimize cooling thereof. The amount of flow through the combustion chamber is regulated by opening and closing the ports 32 at slightly different times than the ports 34. The ports 34 are opened later than ports 32, so that the cylinder region 12 contains primarily fresh air when ports 34 are opened. This permits effective scavenging of the cylinder region 12 without blowing air through the combustion chamber 20, so that when the ports 34 are later opened there is fresh air in the cylinder region to supply fresh air for scavenging the combustion chamber 20 with a minimum of air flow therethrough.

In order to cool the walls of the cylinder region 12 and effectively utilize the combustion products, the engine is constructed to expand the combustion products and extra air to nearly atmospheric pressure before the cylinder region is vented. The exhaust ports 32, 38 of the cylinder member close when the piston 10 is in the position at FIG. 2, and compression then begins until the piston is in the position of FIG. 3. The port closing time and the minimum space 22A above the piston are chosen so that after the air in space 22A is compressed and heated by the combustion products, it will reach nearly atmospheric pressure at the end of the working, or expansion stroke. In the engine of FIG. 3, the minimum volume 22A is greater than the volume of the combustion chamber 20 and may typically be more than twice as great. As an example, in an engine with a space 22A about six times greater than the combustion chamber volume, the air may be compressed to 50 psi at the top of the stroke, then ignited with fuel so that the combined volume of the combustion chamber and air space 22A reaches a temperature of 1,000°F and a pressure of 100 psi, and the gas then expanded to atmospheric pressure. The engine can be modified to provide more power by reducing the extra air space at 22A, but this results in greater heating and may require provisions for cooling. The extra air space at 22A may be referred to as a reduction space because it reduces the heat and pressure of the combustion products. The transfer of heat to the piston is minimized by a heat shield 92 which is mounted at the upper end of the piston which faces the cylinder region 12, and which includes a sheet metal disc 94 that rests on a perforated spacer plate 96.

The use of the target 46 which is disposed centrally in the chamber, that is at a region spaced from the walls of the chamber, results in better distribution and break up of the fuel stream. Fuel from the nozzle 42 which hits the target 46 is dispersed in all directions so that it mixes more completely with the air in the combustion chamber. It is possible to utilize a spray nozzle that sprays fuel in a wide angled cone, but such a nozzle cannot readily distribute fuel near the wall through which the spray enters the chamber. The target 46 within the chamber can make a more complete and even distribution as well as helping to break up the fuel droplets. The nozzle 42 is different from a typical diesel injection nozzle wherein an atomization spray is created. Instead, the nozzle 42 produces a narrow stream of fuel that is dispersed by the target 46. The target 46 is a flat disc and disperses the fuel initially into a large disc-spaced area. The glow plug 47 is located in line with a small hole 47a that is aligned with the target 46, so that fuel reaches the glow plug area to permit ignition in starting the engine. The target can also serve as a heated element within the chamber that helps to promote combustion of the fuel entering the chamber. Of course, a variety of devices can be utilized to ignite the fuel, including spark plugs as well as glow plugs, and after the engine begins running the chamber walls and/or target can often be sufficient to provide ignition. The power output of the engine is varied primarily qualitatively, by varying the amount of injected fuel.

Figure 10:
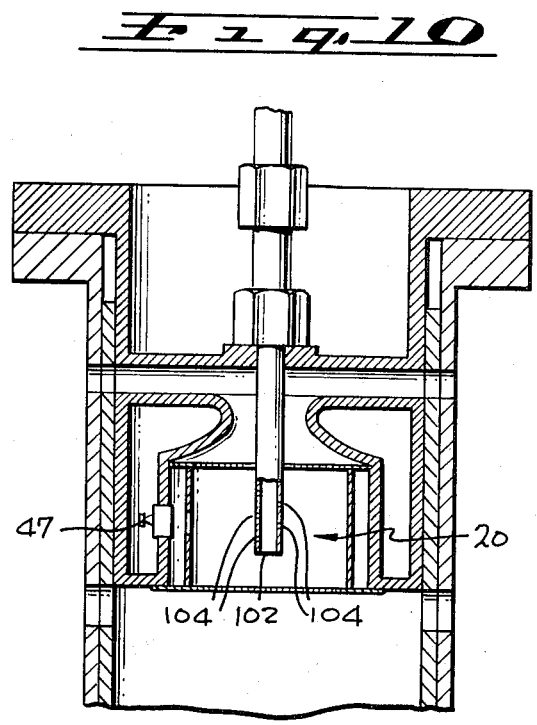
FIG. 10 is a partial sectional side view of an engine constructed in accordance with another embodiment of the invention, in which gaseous fuel is utilized.
Figure 9:
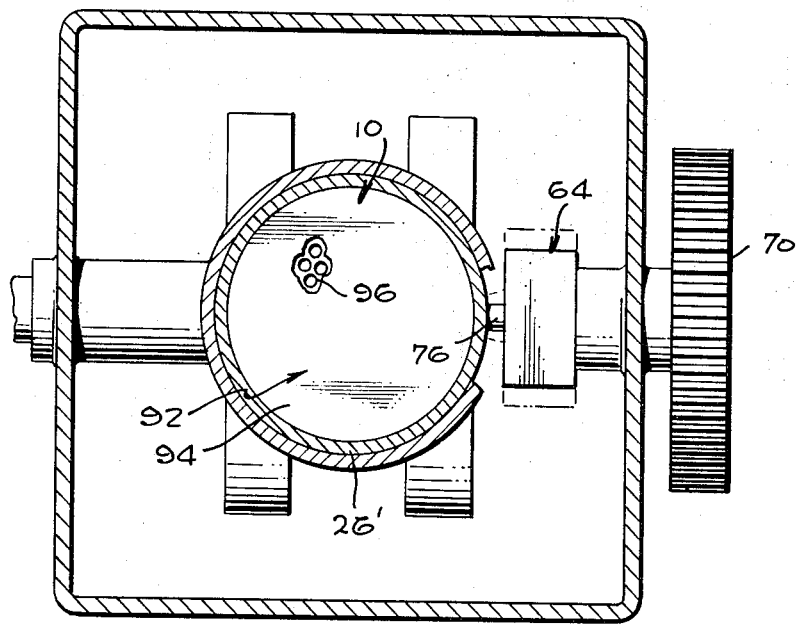
FIG. 9 is a view taken on the line 9—9 of FIG. 5.
Figure 7:
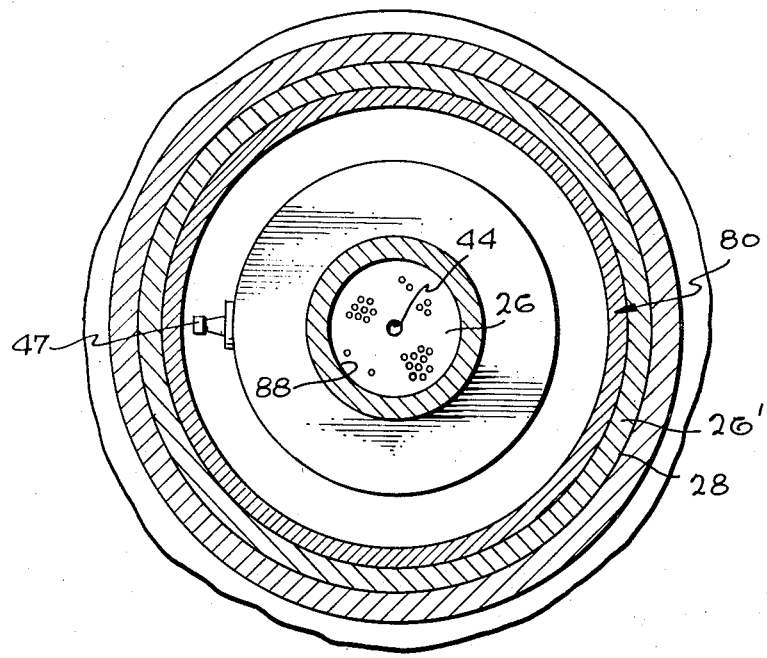
FIG. 7 is a view taken on the line 7—7 of FIG. 5.
Figure 8:
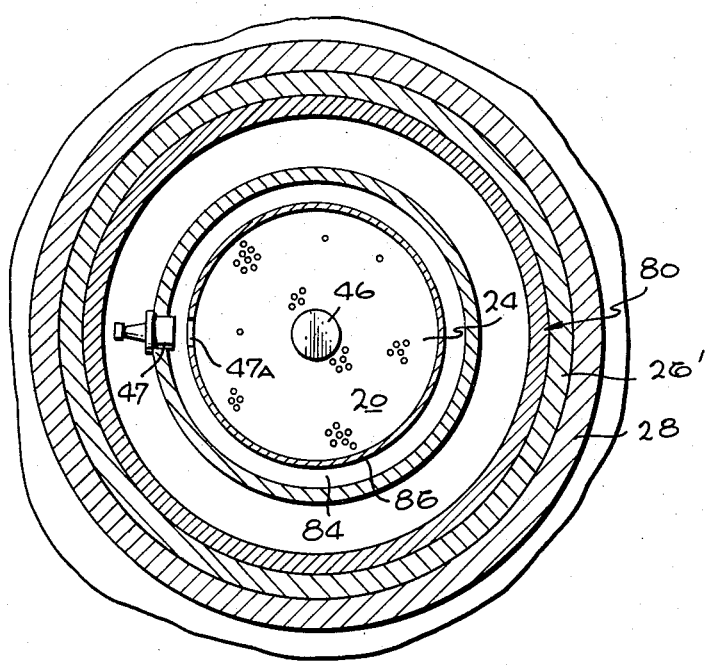
FIG. 8 is a view taken on the line 8—8 of FIG. 5.

The engine of the invention can burn a variety of fuels including gaseous fuels such as natural gas. FIG. 10 illustrates an injector arrangement for gaseous fuels, in which a nozzle extension 102 is provided which extends into the chamber 20 and which has outlets 104 through which gas is ejected. The use of a nozzle extension with holes therein permits the even distribution of fuel within the chamber without a target therein.

Thus, an engine is provided which burns fuel in a hot environment, to thereby provide for more complete combustion, and yet the piston which converts the generated pressure to mechanical power moves along cylinder walls that are maintained at only a moderate temperature. This is accomplished by providing a separate combustion chamber in which most of the combustion occurs and which is physically separated by walls from the cylinder region in which the cylinder moves. The separating walls form a constricted passage to largely isolate the combustion chamber so that heat is retained therein and most of the combustion occurs therein, and yet the passage is large enough so that the flow of the hot combustion products into the cylinder region occurs in a small fraction of a cycle time. The cylinder region is prevented from heating to a high temperature by the use of extra air in a reduction space at the end of the cylinder region nearest the combustion chamber and by the use of an additional port or set of ports to flow extra purging air through the cylinder region without requiring it to flow through the combustion chamber. In many small engine applications, a water cooling system or special air cooling system with heat-dissipating fins and the like can be avoided. Fuel can be added to the combustion chamber in a variety of ways, particularly by the injection of fuel. Good distribution of the fuel is obtained by the use of a target spaced from the walls of the chamber and in the path of fuel injected as a high velocity (e.g., 100 feet per second) stream from a nozzle. It should be understood that the "piston" may be either a reciprocating or rotary type, and the term "cylinder" refers to the expansion region in which gases expand and the piston moves and which is not necessarily of geometrically cylindrical shape.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In an engine which includes a cylinder region and a piston device that moves within the cylinder region, the improvement comprising:
   walls defining a combustion chamber, including a wall with a plurality of holes communicating with said cylinder region, said combustion chamber being insulatingly mounted to minimize the loss of heat from the walls thereof to the surroundings; and
   means for applying air and fuel to said chamber, so that the mixture thereof can ignite and burn within the chamber and the combustion products can pass through said holes into the cylinder region.

2. The improvement described in claim 1 wherein:
   said means for applying air and fuel includes first and second cylinder valve means at opposite portions of the cylinder region and a third valve means communicating with a portion of the combustion chamber which is spaced from said wall that has a plurality of holes, whereby to permit a lesser flow of purge air through the combustion chamber than through the cylinder.

3. An engine comprising:
   a cylinder with first and second end portions;
   a piston reciprocally mounted in the cylinder to move toward and away from the first cylinder end portion;
   a combustion chamber mounted near said first cylinder end portion, said chamber having a first perforated wall facing the first cylinder end portion to supply combustion products of fuel burned in the chamber to the cylinder, and said chamber having a second perforated wall;
   an exhaust valve communicating with the second perforated wall of the combustion chamber;
   valve means communicating with the cylinder to flow air in a path that leads through the cylinder, the combustion chamber, and the exhaust valve;
   a fuel injector for injecting fuel into said combustion chamber; and
   timing means for operating said exhaust valve, said valve means, and said fuel injector in synchronism with movement of said piston.

4. The engine described in claim 3 wherein:
   the volume enclosed at the first cylinder end portion, when the piston is closest thereto, is at least twice as great as the volume of said combustion chamber.

5. The engine described in claim 3 including:
   a second exhaust valve communicating with said cylinder in a path that bypasses the combustion chamber.

6. The engine described in claim 3 wherein:
   said combustion chamber has a large enough volume to contain sufficient air for complete combustion of all fuel injected therein at substantially full engine load.

7. In an engine which includes a combustion region where air can be burned with fuel and piston means that can be moved by the products of combustion, the improvement comprising:
   a target in said combustion region; and
   a fuel injector which includes a pump and a nozzle that is directed at said target, said nozzle being constructed to direct a narrow high velocity stream of fuel at said target so that the fuel is atomized and dispersed only after impacting the target;
   the tip of said nozzle from which the fuel stream emerges being located outside the walls of said combustion region, and said combustion region walls having a small hole located between the nozzle tip and the target for passing the fuel stream.

8. An engine comprising:
   a cylinder with first and second end portions;
   piston means mounted in said cylinder to move towards and away from said first cylinder end portion;
   walls defining a combustion chamber with a constricted passage in communication with said first cylinder end portion;
   means for purging said chamber and adding fuel thereto in synchronism with movement of said piston; and
   a valve including a port in communication with said chamber;
   the walls of said chamber including a pair of plate-like walls, each having a plurality of holes, one of said walls forming said constricted passage and the other wall being in communication with said valve port.

9. In an engine which includes a cylinder region and a piston device that moves within the cylinder region, the improvement comprising:
   walls defining a combustion chamber, including a wall with a plurality of holes communicating with said cylinder region, said combustion chamber being insulatingly mounted to minimize the loss of heat from the walls thereof to the surroundings; and
   means for applying air and fuel to said chamber, so that the mixture thereof can ignite and burn within the chamber and the combustion products can pass through said holes into the cylinder region;
   the minimum volume in said cylinder region being greater than the volume of the combustion chamber, whereby to reduce the pressure and temperature of gas in the cylinder region.

10. An engine comprising:
    a cylinder with first and second end portions;
    piston means mounted in said cylinder to move towards and away from said first cylinder end portion;
    walls defining a combustion chamber with a constricted passage in communication with said first cylinder end portion;
    means for purging said chamber and adding fuel thereto in synchronism with movement of said piston; and
    a valve including a port in comunication with said chamber;
    the walls of said chamber including a wall having a plurality of holes in communication with said valve port.

* * * * *